United States Patent
Kim

(10) Patent No.: US 6,351,372 B1
(45) Date of Patent: Feb. 26, 2002

(54) PERSONAL COMPUTING DEVICE WITH FOLDABLE KEYBOARD

(75) Inventor: Seung Kil Kim, Chapel Hill, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/388,092

(22) Filed: Sep. 1, 1999

(51) Int. Cl.$^7$ ............................... H05K 7/16; G06F 1/16
(52) U.S. Cl. ................... 361/683; 361/680; 361/686; 400/489; 312/208.4; 345/168
(58) Field of Search ............................... 361/680, 683, 361/686, 424–727; 400/492, 472, 473, 477, 479, 488, 489; 341/21, 22; 312/208.1, 208.4; D14/247; D18/1, 7, 52; 345/169, 168

(56) References Cited

U.S. PATENT DOCUMENTS

| | | | |
|---|---|---|---|
| 3,627,959 A | * 12/1971 | Chapell et al. | 200/61.62 |
| 5,103,376 A | * 4/1992 | Blonder | 361/393 |
| 5,175,672 A | * 12/1992 | Conner et al. | 361/393 |
| 5,200,913 A | * 4/1993 | Hawkins et al. | 364/708 |
| 5,241,303 A | * 8/1993 | Register et al. | 340/706 |
| 5,255,214 A | * 10/1993 | Ma | 364/708.1 |
| 5,276,589 A | * 1/1994 | Bartlett et al. | 361/681 |
| 5,337,212 A | * 8/1994 | Bartlett et al. | 361/681 |
| 5,345,403 A | * 9/1994 | Ogawa et al. | 364/708.1 |
| 5,375,076 A | * 12/1994 | Goodrich et al. | 364/708.1 |
| 5,494,447 A | * 2/1996 | Zaidan | 439/31 |
| 5,539,615 A | * 7/1996 | Sellers | 361/680 |
| 5,548,478 A | * 8/1996 | Kumar et al. | 361/681 |
| 5,594,619 A | * 1/1997 | Miyagawa et al. | 361/681 |
| 5,644,469 A | * 7/1997 | Shioya et al. | 361/681 |
| 5,742,475 A | * 4/1998 | Riddiford | 361/681 |
| 5,777,704 A | * 7/1998 | Selker | 349/58 |
| 5,808,862 A | * 9/1998 | Robbins | 361/681 |
| 5,900,848 A | * 5/1999 | Haneda et al. | 345/1 |
| 6,005,767 A | * 12/1999 | Ku et al. | 361/681 |

FOREIGN PATENT DOCUMENTS

| | | |
|---|---|---|
| EP | 0766166 A1 | 4/1997 |
| WO | WO9603685 A | 2/1996 |

OTHER PUBLICATIONS

Academic Press Dictionary of Science and Technology, Edited by Christopher Morris, Academic Press, Inc., 1992.*
Information about "Clio—The Ideal PC Companion from Vadem" from http://www.clio.com/clio/index.html, date and author unknown.

* cited by examiner

*Primary Examiner*—Leo P. Picard
*Assistant Examiner*—Anatoly Vortman
(74) *Attorney, Agent, or Firm*—Coats & Bennett, P.L.L.C.

(57) ABSTRACT

A personal computing device comprises a chassis having a top and a bottom and a keyboard movably secured to the chassis. The keyboard includes a pair of laterally spaced arms with each arm having a connector that projects therefrom and confined within an elongated slot formed on the side of the chassis. This enables the keyboard to move between three different positions: (1) a closed position where the keyboard lies adjacent the top of the chassis, (2) an open position where the keyboard extends outwardly from the chassis, and (3) a stowed position where the keyboard lies adjacent the bottom of the chassis. Both the chassis and keyboard include IR ports that enable the keyboard to communicate with the chassis, thereby eliminating a wire connection between the chassis and keyboard.

21 Claims, 5 Drawing Sheets

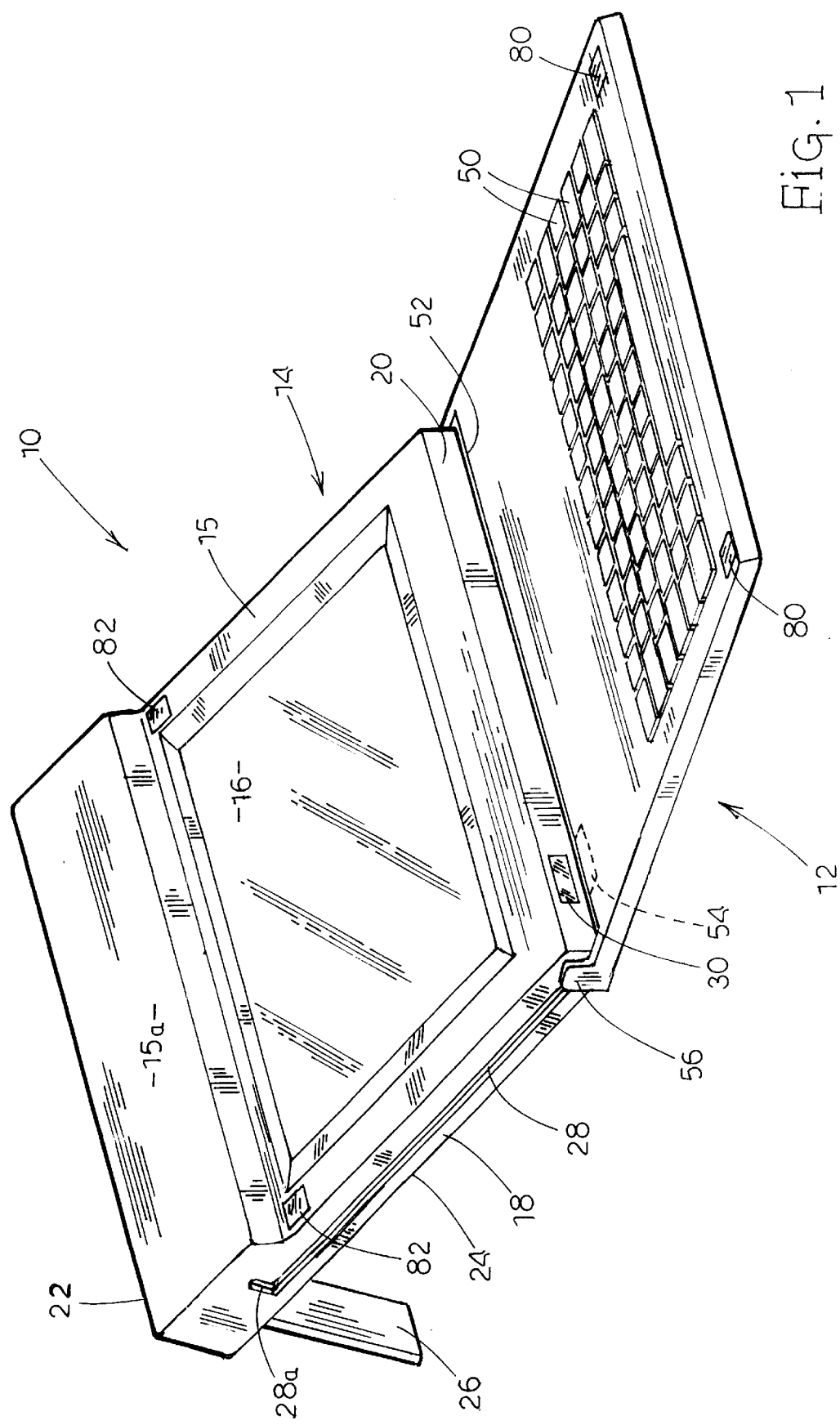

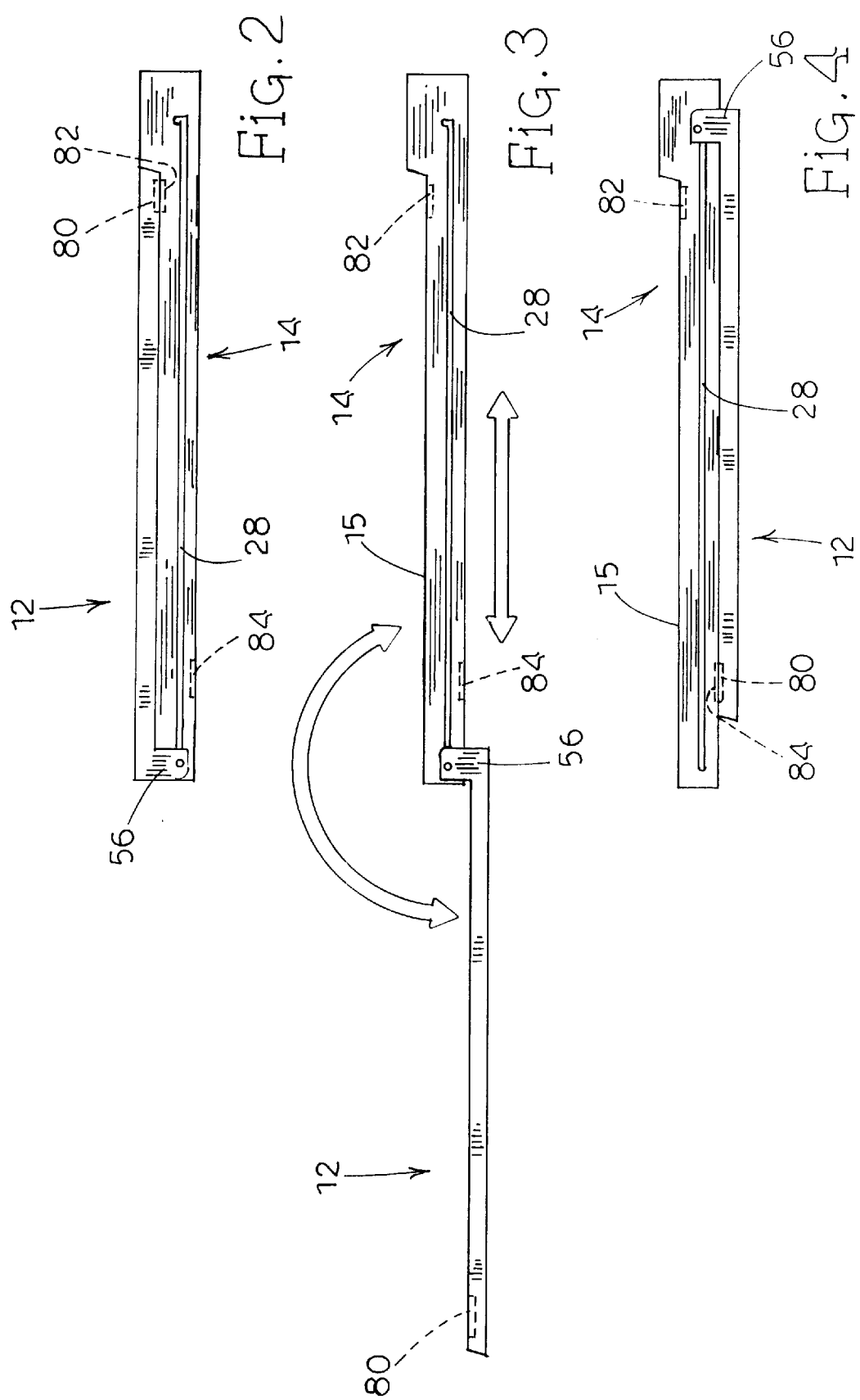

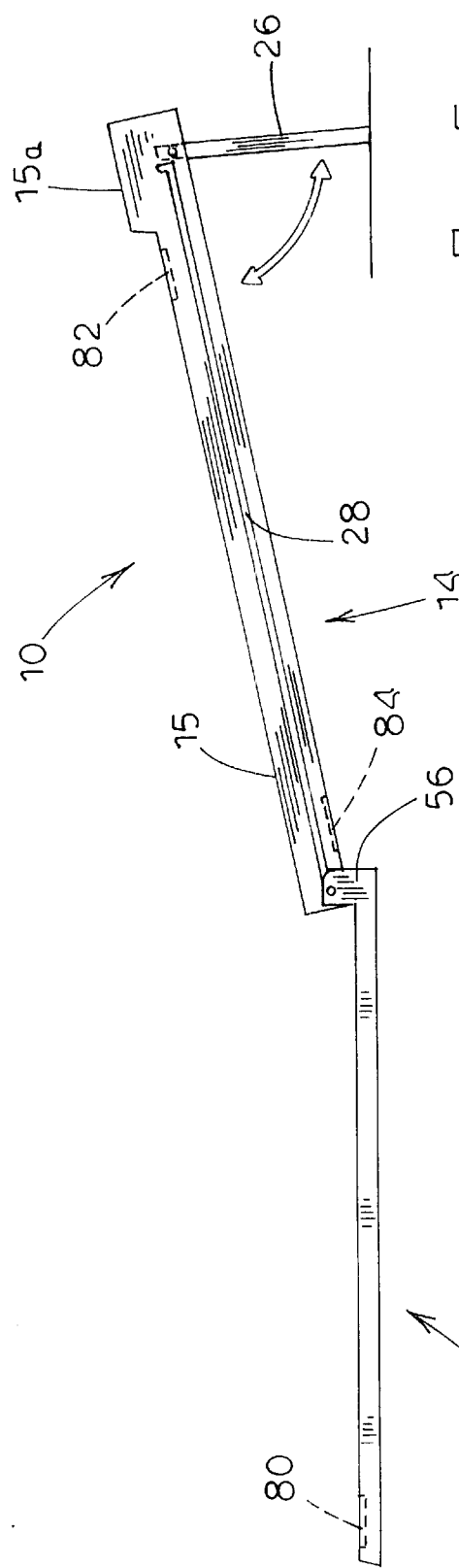
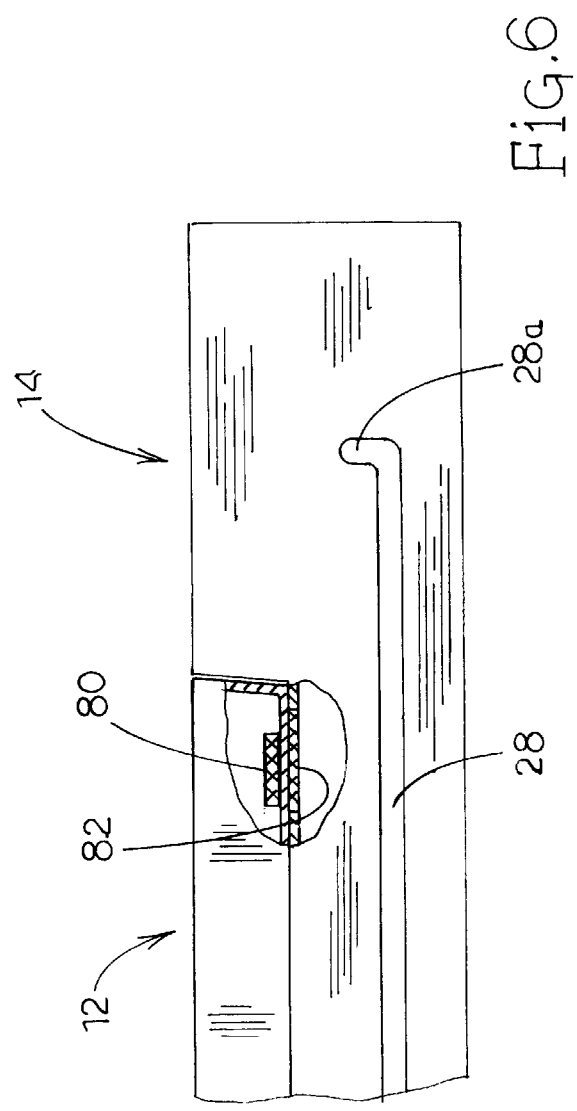

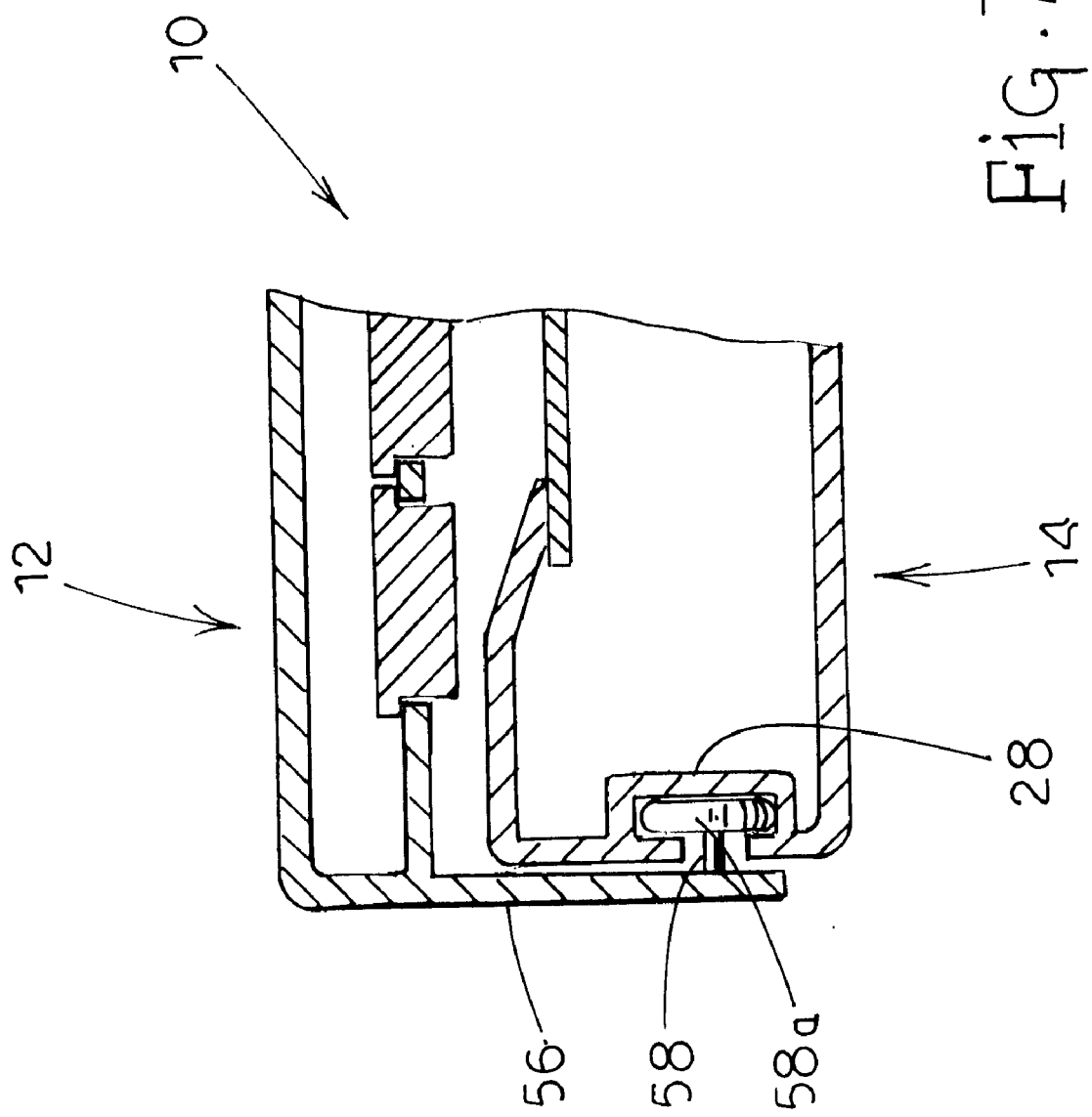

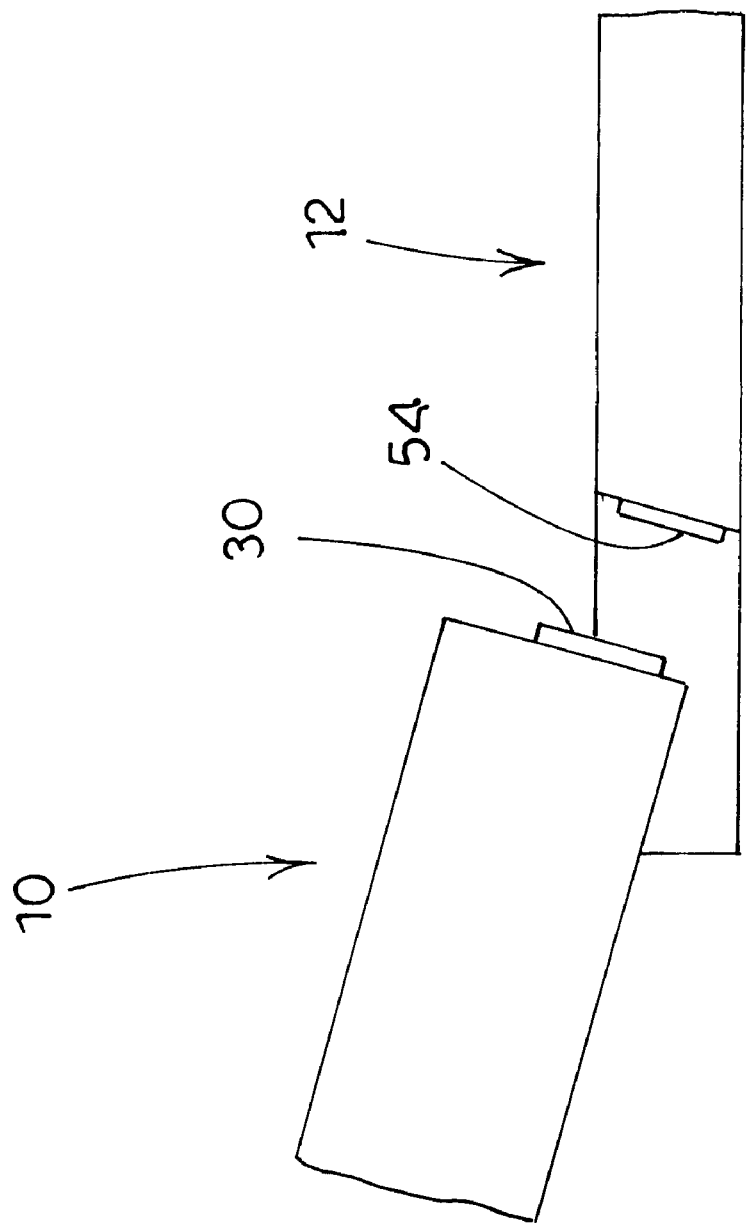

PERSONAL COMPUTING DEVICE WITH FOLDABLE KEYBOARD

FIELD OF THE INVENTION

The present invention relates to personal computing devices, such as a notebook computer or a personal digital assistant, having an attached keyboard that is movable between a series of distinct positions.

BACKGROUND OF THE INVENTION

As personal computers have increased in power and decreased in size, portable computers have become more useful and powerful. Initially, portable computers were essentially desktop computers requiring the use of a desktop and access to household current. Eventually, battery powered portable computers featuring a liquid crystal display ("LCD") weighing 10 to 20 pounds allowed true freedom for the computer user. Notebook computers weighing from 4 to 10 pounds and having a length and width approximately that of notebook paper offered an increased degree of portability, without substantially sacrificing desktop computer power.

In recent years, personal computers even smaller that the traditional notebook computer have become quite popular. For example, personal digital assistants (PDA's) have become successful and are widely used. Many of these PDA's or sub-notebook computers still require the use of a keyboard for inputting large amounts of data or report writing. This is particularly true with large PDA's or semi-notebook computers based on Win-CE since these computers require a keyboard for data entry and report writing.

There are many situations or applications where these computing devices require the user to enter data or write while the computing device is held in a standing position. This is especially true in certain field applications such as where employees of utility businesses enter water or electricity usage into the computing device through a keyboard while standing up and holding the unit in one hand and entering the data with the other hand. In situations such as these, it is important that the keyboard be accessible and easy to use, and at the same time be attached to the chassis or main body in such a manner that it can be closed or stowed to form a compact unit.

SUMMARY OF THE INVENTION

The present invention entails a personal computing device that includes a chassis or main computing module that includes a top and bottom along with a keyboard that is movably secured to the chassis. In one embodiment of the present invention, the keyboard is movable from an open and operative position to a stowed position where the keyboard lies underneath and adjacent the bottom of the chassis.

Further, the keyboard may be secured to the chassis in such a fashion that will permit the keyboard to move with respect to the chassis between three distinct positions: (1) a closed position where the keyboard lies adjacent the top of the chassis, (2) an open and operative position where the keyboard is accessible, and (3) a stowed position where the keyboard lies underneath and adjacent the bottom of the chassis.

More particularly, in a specific embodiment of the present invention, the chassis or main computing module includes a visual display that is formed on the top of the chassis. The keyboard includes a pair of laterally spaced arms that project therefrom with each arm including a connector projecting therefrom. Each of the connectors is confined and movable within an elongated slot formed about a side portion of the chassis. As the keyboard is moved from the closed position to the open position, the connectors generally pivot or rotate within a portion of the respective slots. As the keyboard is moved from the open position to the stowed position, the respective connectors move within the slots to a position where the keyboard lies substantially underneath the chassis and adjacent the bottom thereof.

Other objects and advantages of the present invention will become apparent and obvious from a study of the following description and the accompanying drawings which are merely illustrative of such invention.

BRIEF DESCRIPTION OF THE DRAWINGS

FIG. 1 is a perspective view of the personal computing device with the foldable keyboard.

FIG. 2 is a side elevational view of the personal computing device with the keyboard being disposed in the closed position.

FIG. 3 is a side elevational view of a personal computing device with the keyboard disposed in the open or operative position.

FIG. 4 is a side elevational view of the personal computing device with the keyboard being disposed in the stowed position.

FIG. 5 is a side elevational view of the personal computing device illustrating the foldable support supporting the chassis in an inclined position above a support surface.

FIG. 6 is a fragmentary side view illustrating the magnet type fastener for securing the keyboard to the chassis.

FIG. 7 is a fragmentary cross-sectional view illustrating a keyboard connector confined within a slot formed in the side of the chassis.

FIG. 8 is a fragmentary side elevational view illustrating the IR ports associated with the chassis and keyboard.

DETAILED DESCRIPTION OF THE INVENTION

With further reference to the drawings, a computing device is shown therein and indicated generally by the numeral 10. Computing device 10 can be, for example, any type of personal computing device such as a personal digital system (PDA), sub-notebook computer, or a notebook-type computer. The use of the term personal computer or computing device is intended to embrace all portable computing devices.

The personal computer or computing device 10 comprises a chassis or main computing module which is indicated generally by the numeral 14. Movably secured to the chassis 14 is a keyboard 12. As will be appreciated from subsequent portions of the disclosure, the keyboard 12 is designed to move between three distinct positions: (1) a closed position (FIG. 2), (2) an open or operative position (FIG. 3), and (3) a stowed position (FIG. 4).

Viewing the chassis or main computing module 14 in more detail, it is seen that the same includes a non-planer top 15 that includes a raised panel 15a disposed about one portion of the top. Formed on the top is a visual display 16. While the visual display may be a liquid crystal display (LCD), it is contemplated that a reflective colored display may be more appropriate, especially for outdoor use. Further, chassis 10 includes a pair of opposed sides 18, a front edge 20 and a back edge 22. In addition, the chassis 10 includes a bottom 24. Formed in each side 18 is an elongated C-shaped slot 28. As seen in FIGS. 2 and 3, at one end of the slot there is provided a vertical slot extension 28a.

To support the chassis 10 in an inclined position as illustrated in FIG. 1 and 5, there is provided a pair of foldable supports or legs 26. Each foldable support 26 is movable between an extended position (FIGS. 1 and 5) and a retracted position (FIG. 2) where the support generally folds into the bottom 24 of the chassis 10.

FIG. 7 illustrates the elongated slot 28 in more detail. While the slot 28 may be a simple elongated opening in the side 18 of the chassis 14, in the embodiment of FIG. 7 the slot takes on a C-shaped configuration. As will be appreciated from subsequent portions of the disclosure, the C-shaped slot enables a roller or wheel to be confined therein and essentially forms an elongated track through which the roller or wheel moves.

Turning to a discussion of the keyboard 12, it should be noted that the keyboard may be constructed of various materials, but it is contemplated that magnesium would be a preferred material because of its strength and light weight. In any event, the keyboard 12 includes an upper keyboard surface comprised of an array of keys 50. Keyboard 12 may be of any standard design such as a QWERTY keyboard. In addition, other types of keyboards may be employed such as keyboards employing touch-sensitive keys or membrane keys.

The keyboard 12 includes a front edge 52 and a pair of arms 56 that project therefrom and connect to the chassis 14. More particularly, the arms 56 are laterally spaced such that they can extend past the front edge 20 of the chassis 14. Further, formed or connected on the inside terminal ends of the arms 56 is a pair of connectors 58. Each of the connectors 58 project inwardly from a respective arm 56 and extend through one of the respective elongated slots 28. There the connector 58 is confined within the slot, but is rotatable therein as well as movable from end to end within the elongated slot. In the embodiment of FIG. 7, the connector includes a rotating guide wheel 58a. The guide wheel 58a is bearinged on the connector 58 or otherwise rotatable with respect to the connector 58. Further, as seen in FIG. 7, the rotating guide wheel 58a that forms a part of the connector is confined within the C-shaped slot of 28. Thus as the connector arms 56 move along the sides 18 of the chassis 14, it is appreciated that the guide wheels 58a move within the C-shaped slot 28.

Although the keyboard 12 may be connected to the chassis 10 through a wire-type connection, it is contemplated that in a preferred embodiment the keyboard 12 would communicate with the chassis through infrared (IR) coded signals. In that regard, note that the front edge 20 of the chassis 14 includes an IR port 30 while the front edge 52 of the keyboard 12 also includes an IR port 54. IR port 30 would typically include an IR transceiver that would function to both emit and receive IR signals. As such the IR port 30 could communicate with other peripherals through IR signals. IR port 54 would, on the other hand, include an IR emitter since its basic function would be to communicate with the chassis through the IR transceiver port 30.

As illustrated in FIG. 1, when the keyboard 12 assumes an open and operative position, the IR ports 30 and 52 are disposed relative to each other such that infrared signals can be directed from the keyboard IR port 52 to the chassis IR port 30. To power the keyboard 12, a disc Li-ion battery would be provided. Details of the mechanisms and circuitry for generating the coded IR signals is not dealt with herein because such is not per se material to the present invention, and because it is known to provide wireless infrared communications between the keyboard and a chassis of personal computing devices.

Keyboard 12 is provided with one or more fasteners for securing the same to the chassis 14 in both the closed and stowed positions (FIG. 2 and 4). In the embodiment illustrated, a pair of magnetic strips 80 are provided on the top outer corners of the keyboard 12. These magnetic strips 80 are designed to mate with a first set of metal plates or tabs 82 formed on the top 15 of the chassis 14 adjacent the raised panel 15a. Further, the magnetic strips 80 are particularly spaced to mate with a second set of metal plates or tabs 84 disposed on the bottom of the chassis 10 (FIG. 4). This second set of metal plates or tabs 84 serve to fasten the keyboard 12 in the stowed position.

As seen in the drawings, the keyboard 12 is movable back and forth between a number of different positions all while being attached to the chassis 10. For example, in FIG. 2, the keyboard 12 is folded to where it overlies the top 15 and the visual display 16 of the chassis 10. This position is referred to as a closed position.

To use the personal computing device 10, the keyboard 12 is rotated counterclockwise from the position shown in FIG. 2 to the position shown in FIG. 3. It will be appreciated that as the keyboard 12 is rotated, the individual connectors 58 are retained in the front portion of the elongated slot 28 and rotate therein. When the personal computing device 10 is used on a desk or other support surface, the chassis 14 and visual display 16 can be tilted or inclined such that the visual display 16 can be easily viewed while manipulating the keyboard 12. This is accomplished by folding the support legs 26 from their retracted position to their extended position, shown in FIGS. 1 and 5. It should be noted that when the keyboard 12 assumes the open position of FIGS. 1 and 5, it may be beneficial to provide some mechanism or design arrangement that will prevent they keyboard from inadvertently sliding underneath the chassis. This can be accomplished in various ways. For example, the chassis 10 and keyboard 12 can be designed such that in the open position, as shown in FIG. 1, the front edge 52 of the keyboard would engage the front edge 20 of the chassis in the event the keyboard started to slide or move towards the chassis. This would prevent the keyboard from sliding underneath the chassis 10 when the keyboard 12 and chassis 10 assume the orientation shown in FIG. 1.

From the open position, the keyboard 12 can be moved in a sliding fashion to the stowed position of FIG. 4. More particularly, arms 56 are of such a length that the entire keyboard 12 is permitted to slide underneath the chassis 10 while the connectors 58 and their guide wheels 58a are confined within the elongated slots 28. Thus, from the open position shown in FIG. 3, the keyboard 12 can be moved generally horizontal, from left to right as viewed in FIG. 3 and 4, to where the keyboard 12 assumes the stowed position. Note, in the stowed position that the second set of metal plates or tabs 84 overlie the magnetic strips 80 secured to the keyboard 12 and effectively fasten the outer terminal end of the keyboard 12 to the chassis 14. At the same time, the connectors 58 tend to move up into the vertical slot extensions of 28a formed at the extreme end of the elongated slots 28. This enables the keyboard 12, when stowed, to be disposed in a general parallel relationship with the bottom 24 of the chassis 10.

Finally, it is appreciated that the entire keyboard 12 can be easily and conveniently moved back and forth between all three of the positions illustrated in FIGS. 2, 3 and 4. This enables the keyboard to remain connected to the chassis 14 at all times and to be easily used even while the user is inputting data or information from a standing position.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A personal computer having a foldable keyboard, comprising:
    a. a computing module having a top and bottom;
    b. a keyboard having a top and a bottom movably secured to the computing module and movable between three distinct positions:
        i. a closed position where the keyboard lies adjacent the top of the computing module;
        ii. an open and operative position where the keyboard is accessible; and
        iii. a stowed position where the top of the keyboard lies adjacent to and faces the bottom of the computing module.
2. The personal computer of claim 1 including a series of fasteners for securing the keyboard to the computer module in the closed and stowed positions.
3. The personal computer of claim 2 wherein each fastener includes a magnetic fastener and a metal plate.
4. The personal computer of claim 1 wherein in moving between the opened and stowed positions, the keyboard slides underneath the computing module.
5. The personal computer of claim 1 wherein the keyboard includes a pair of connectors confined within a pair of elongated slots formed in the computing module and wherein the connectors slide in the elongated slots as the keyboard moves between the open and stowed positions.
6. The personal computer of claim 5 wherein each connector includes an arm extending from he keyboard and a connecting pin extending from the arm and through the elongated slot formed in the computing module.
7. The personal computer of claim 1 including a visual display disposed on the top of the computing module.
8. The personal computer of claim 7 including a foldable support structure connected to the computing module and moveable between an extended position and a retracted position, the foldable support structure in the extended position adapted to support the computing module in an inclined position.
9. The personal computer claim 1 wherein both the keyboard and computing module include IR ports for permitting the keyboard to communicate with the computing module via infrared signals.
10. A personal computing device comprising:
    a. a chassis having a top, bottom and opposed sides;
    b. a visual display disposed on the top of the chassis;
    c. an elongated slot formed in each side of the chassis;
    d. a keyboard movably mounted to the chassis and including a pair of laterally spaced arms that project from the keyboard with each arm including a connecting pin that projects through and is confined within a respective slot in the chassis; and
    e. wherein the connecting pins permit the keyboard to pivot and slide with respect to the chassis and to move between three distinct position:
        i. a closed position where the keyboard lies adjacent the top of the chassis;
        ii. an open and operative position where the keyboard is accessible; and
        iii. a stowed position where the keyboard lies adjacent the bottom of the chassis.
11. The personal computing device of claim 10 wherein the connecting pins project inwardly from the arms extending from the keyboard.
12. The personal computing device of claim 10 wherein the arms slide exteriorly of the chassis as the keyboard is moved between the open and stowed positions.
13. The personal computing device of claim 10 wherein the keyboard is provided with at least one magnetic fastener that fastens to a first metal plate when the keyboard assumes the closed position and to a second metal plate when the keyboard assumes a stowed position.
14. The personal computing device of claim 10 wherein both the keyboard and chassis include IR ports for permitting the keyboard to communicate with the chassis via infrared signals.
15. The personal computing device of claim 10 wherein in the stowed position the keyboard fits flush against the bottom of the chassis and wherein the keyboard includes an array of keys that are disposed at the interface between the bottom of the chassis and the keyboard.
16. The personal computing device of claim 10 including a foldable support movably mounted to the chassis and movable between an extended position and a retracted position, and wherein in the extended position the foldable support supports the chassis in an inclined position with respect to an underlying surface.
17. A personal computer comprising:
    a. a computing module comprising a top and a bottom;
    b. a keyboard comprising an upper key surface area and being movably secured to the computing module for movement between open and stowed positions; and
    c. wherein in moving between the open and stowed positions the keyboard, with key surface area facing the bottom of the computing module, slides back and forth adjacent the bottom of the computing module, and in the stowed position the keyboard lies underneath the computing module and adjacent the bottom of the computing module.
18. The personal computer of claim 16 wherein the computing module comprises a pair of spaced apart elongated slots and the keyboard comprises a pair of connectors associated therewith that project through the slots permitting the entire keyboard to slide back and forth while the connectors effectively secure the keyboard to the computing module.
19. The personal computer of claim 18 wherein the keyboard comprises a pair of laterally spaced arms projecting therefrom and wherein each connector projects from a terminal end portion of a respective arm.
20. A personal computer having a folding keyboard, comprising:
    a chassis having a top and bottom; and
    a keyboard comprising a top and a bottom movably secured to the chassis and movable between three distinct positions:
        a closed position where the keyboard lies adjacent the top of the chassis;
        an open and operative position where the keyboard is accessible; and
        a stowed position where the top of the keyboard lies adjacent to and faces the bottom of the chassis;

said keyboard comprising:
- a pair of connectors confined within a pair of elongated slots formed in the chassis, and wherein the connectors slide in the elongated slots as the keyboard moves between the open and stowed positions;
- each connector comprising an arm extending from the keyboard and a connecting pin from the arm and through the elongated slot formed in the chassis; and
- each elongated slot comprising a vertical slot extension formed about one end portion of the slot and wherein the connecting pins come to rest in the vertical slot extensions when the keyboard assumes the stowed position.

21. A personal computer having a folding keyboard, comprising:
- a computing module having a top and bottom; and
- a keyboard supported by the computing module and comprising a top and a bottom, the keyboard movably secured to the computing module and movable independently of the computing module between three distinct positions:
  - a closed position where the keyboard lies adjacent the top of the computing module and is supported by the top of the computing module;
  - an open and operative position where the keyboard is accessible; and
  - a stowed position where the top of the keyboard lies adjacent to and faces the bottom of the computing module.

* * * * *